United States Patent
Yoshida et al.

(10) Patent No.: US 6,271,338 B1
(45) Date of Patent: Aug. 7, 2001

(54) POLYETHYLENE NAPHTHALENEDICARBOXYLATE RESIN COMPOSITION

(75) Inventors: Yoichi Yoshida; Minoru Suzuki; Hiroki Nagano, all of Ehime (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/402,163

(22) PCT Filed: Feb. 8, 1999

(86) PCT No.: PCT/JP99/00531

§ 371 Date: Sep. 30, 1999

§ 102(e) Date: Sep. 30, 1999

(87) PCT Pub. No.: WO99/40155

PCT Pub. Date: Aug. 12, 1999

(30) Foreign Application Priority Data

Feb. 9, 1998 (JP) .................................................. 10/027132

(51) Int. Cl.⁷ ....................................................... C08J 3/00
(52) U.S. Cl. ......................... 528/298; 528/280; 528/285; 528/286
(58) Field of Search ..................................... 528/298, 286, 528/280, 285

(56) References Cited

U.S. PATENT DOCUMENTS

| 4,963,644 | * | 10/1990 | Duh | 528/298 |
|---|---|---|---|---|
| 5,138,025 | * | 8/1992 | Mossman | 528/298 |
| 5,596,068 | * | 1/1997 | Kramer et al. | 528/283 |
| 5,851,612 | * | 12/1998 | Umeda et al. | 528/286 |
| 5,955,196 | * | 9/1999 | Sakellerides | 528/298 |

FOREIGN PATENT DOCUMENTS

| 49-59897 | 6/1974 | (JP) | . |
| 7-109340 | 4/1995 | (JP) | C08G/63/189 |
| 7-258395 | 10/1995 | (JP) | C08G/63/189 |
| 8-106141 | 4/1996 | (JP) | G03C/1/795 |
| 9-77859 | 3/1997 | (JP) | C08G/63/189 |
| 10-17754 | 1/1998 | (JP) | C08L/67/02 |

* cited by examiner

Primary Examiner—Veronica P. Hoke
(74) Attorney, Agent, or Firm—Sughrue, Mion, Zinn, Macpeak & Seas, PLLC

(57) ABSTRACT

Provided is a polyethylene naphthalenedicarboxylate resin composition having excellent transparency and hue, and containing a cobalt compound as a color-controlling agent, wherein the polyethylene naphthalenedicarboxylate resin composition comprises a polyethylene naphthalenedicarboxylate, an antimony compound, a cobalt compound and a phosphorous compound which is expressed by a specific structural formula and has an acid dissociation constant pKa of 1.0 or more, and the polyethylene naphthalenedicarboxylate resin composition is produced by using an antimony compound as a polycondensation catalyst.

10 Claims, No Drawings

POLYETHYLENE NAPHTHALENEDICARBOXYLATE RESIN COMPOSITION

TECHNICAL FIELD

The present invention relates to a polyethylene naphthalenedicarboxylate resin composition and to a bottle which is molded therefrom. More specifically, it relates to a polyethylene naphthalenedicarboxylate resin composition whose molded product is free from the whitening phenomenon and cloudiness and has excellent transparency and good hue although the resin composition has been produced by using a less expensive antimony compound as a catalyst and contains a cobalt compound as a color-controlling agent, and to a bottle which is molded therefrom.

BACKGROUND ART

Polyethylene naphthalenedicarboxylate (hereafter, this may be abbreviated as PEN in some case) is superior in basic physical properties such as heat resistance, gas barrier-property, chemical resistance and the like to polyethylene terephthalate. Because of these merits, polyethylene naphthalenedicarboxylate is increasing its uses as a bottle (container), a sheet material and others in recent years. For these uses, many proposals of blending with polyethylene terephthalate have been made beside the single use of polyethylene naphthalenedicarboxylate.

As for a material to be used for a bottle, especially a beverage bottle, it is strongly required that the material has excellent transparency from the view point of commercial value of a bottle itself or a beverage product.

Polyethylene naphthalenedicarboxylate has a lower crystallization speed than polyethylene terephthalate, and the problem of whitening on blow molding is not so extreme as in polyethylene terephthalate. However, when a certain catalyst composition is used, there is observed a problem of the increasing of the haze of a bottle on molding.

As for catalyst used for producing polyethylene naphthalenedicarboxylate, a catalyst same as that used for producing polyethylene terephthalate is generally used.

For example, Japanese Unexamined Patent Publication No. 7-258394 (applied as Patent Application No. 6-50250 on Mar. 22, 1994, and opened in an unexamined publication on Oct. 9, 1995) describes a method for obtaining polyethylene naphthalate having excellent transparency with a specific catalyst composition in the presence of an antimony compound.

Japanese Unexamined Patent Publication No. 8-157582 (applied as Patent Application No. 6-331921 on Dec. 8, 1994, and opened in an unexamined publication on Jun. 18, 1996) describes a method for suppressing the occurrence of fine foreign matters by adding a specific nitrogen-containing basic compound in polyethylene naphthalate which uses an antimony compound as a catalyst.

Further, Japanese Unexamined Patent Publication No. 10-245433 (applied as Patent Application No. 9-51636 on Mar. 6, 1997, and opened in an unexamined publication on Sep. 14, 1998) describes a method in which polyethylene naphthalate is obtained by adding trimethyl phosphate as a phosphorous compound in the presence of an antimony compound/a cobalt compound.

The inventors of the present invention have found that it is effective to add a specific phosphorous compound for obtaining polyethylene naphthalate having excellent transparency and hue in the coexistence of an antimony compound/a cobalt compound or under conditions where nitrogen-containing basic compound is absent, and they have reached the present invention.

DISCLOSURE OF THE INVENTION

It is preferred to use a germanium compound as a polycondensation catalyst for producing polyethylene naphthalenedicarboxylate from the view points of hue and crystallization property. However, it is not satisfactory from the view points of cost and catalyst activity.

On the other hand, the use of an antimony compound as a polycondensation catalyst is superior to the use of a germanium compound in the view points of cost and catalyst activity; however, it is inferior to the use of a germanium compound as a polycondensation catalyst in the view points of hue and crystallization acceleration, and in the view point of transparency which will be lowered by the deposition of antimony metal. In this case, the addition of a color-controlling agent such as a cobalt compound or the like with the intention of improving the hue can actually improve the hue, but the transparency is unwillingly decreased. Thus, it has been conventionally difficult to improve both the hue and transparency by adding a color-improving agent such as a cobalt compound or the like.

The object of the present invention is to provide a polyethylene naphthalenedicarboxylate resin composition which is produced by using an antimony compound as a polycondensation catalyst, and a polyethylene naphthalenedicarboxylate resin composition which contains a cobalt compound as a color-controlling agent and which is excellent both in transparency and hue.

Other objects and advantageous points of the present invention will become clear from the following explanations.

The present invention comprises the following constituents.

1. A polyethylene naphthalenedicarboxylate resin composition comprising a polyethylene naphthalenedicarboxylate, an antimony compound, a cobalt compound and a phosphorous compound, in which the phosphorous compound is expressed by the following formula 1, and its acid dissociation constant pKa is not less than 1.0.

Formula 1:

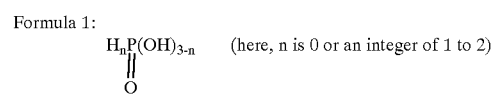

(here, n is 0 or an integer of 1 to 2)

2. A polyethylene naphthalenedicarboxylate resin composition described in the constituent 1, wherein the number of deposited particles which are attributable to a catalyst and whose particle sizes exceed 5 μm is 10 or less per 1 g of the polyethylene naphthalenedicarboxylate resin composition.

3. A polyethylene naphthalenedicarboxylate resin composition described in the constituent 1, wherein the number of foreign matters having particle sizes exceeding 2 μm is 1000 or less per 1 g of the polyethylene naphthalenedicarboxylate resin composition.

4. A polyethylene naphthalenedicarboxylate resin composition described in the constituent 1, wherein the time needed for filtering 1 g of the polyethylene naphthalenedicarboxylate resin composition according to the method defined in the specification is 100 sec or less.

Hereafter, the present invention will be explained in detail.

<<Polyethylene Naphthalenedicarboxylate>>

Polyethylene naphthalenedicarboxylate is obtained by using a naphthalenedicarboxylic acid as the main dicarboxylic acid component and ethylene glycol as the main diol component.

As for the dicarboxylic acid component, the amount of the main component is 70 mol % or more, preferably 80 mol % or more, of the total dicarboxylic acid components. As for the diol component, the amount of the main component is 70 mol % or more, preferably 80 mol % or more, of the total diol components.

Namely, the polyethylene naphthalenedicarboxylate is allowed to have a dicarboxylic acid component other than the main dicarboxylic acid component in the range of 30 mol % or less, preferably 20 mol % or less, as a copolymerization component, and it is allowed to have a diol component other than the main diol component in the range of 30 mol % or less, preferably 20 mol % or less, as a copolymerization component.

When the copolymerization component of dicarboxylic acid exceeds 30 mol % of the dicarboxylic acid components, or the copolymerization component of diol exceeds 30 mol % of the diol components, the properties characteristic to polyethylene naphthalenedicarboxylate, e.g. gas barrier property and thermal resistance, become poor.

Examples of the naphthalenedicarboxylic acid used as the main component include 2,6-naphthalenedicarboxylic acid and 2,7-naphthalenedicarboxylic acid.

Examples of the copolymerizable dicarboxylic acid component include aliphatic dicarboxylic acids such as oxalic acid, malonic acid, succinic acid, adipic acid, sebacic acid, dodecanedicarboxylic acid and the like; aromatic dicarboxylic acids such as terephthalic acid, isophthalic acid, diphenyldicarboxylic acid, diphenoxyethanedicarboxylic acid, diphenylsulfonedicarboxylic acid, diphenyletherdicarboxylic acid and the like; alicyclic dicarboxylic acids such as cyclohexanedicarboxylic acid, decalindicarboxylic acid, tetralindicarboxylic acid and the like; oxy-acids such as glycol acid, p-oxybenzoic acid and the like; and the like.

Examples of the copolymerizable diol component include trimethylene glycol, tetramethylene glycol, hexamethylene glycol, triethylene glycol, neopentyl glycol, cyclohexanedimethanol, bisphenol A and the like.

The polyethylene naphthalenedicarboxylate preferably satisfies the following three conditions at the same time.

| | | |
|---|---|---|
| Content of carboxyl terminal group | 32 eq/T ($10^6$ g) or less | (1) |
| Content of acetaldehyde | 500 ppm or less | (2) |
| Content of diethylene glycol component | 0.4 to 3.0% by weight | (3) |

The content of carboxyl terminal groups of the polyethylene naphthalenedicarboxylate preferably does not exceed 32 eq/T ($10^6$ g). When the content of carboxyl terminal groups exceeds 32 eq/T, the hydrolytic resistance and the thermal resistance are disadvantageously poor.

The acetaldehyde content in the polyethylene naphthalenedicarboxylate preferably does not exceed 500 ppm. When the content of acetaldehyde exceeds 500 ppm, it is not sufficiently decreased even when the polyethylene naphthalenedicarboxylate is subjected to a solid-phase polymerization, and such polyethylene naphthalenedicarboxylate is unfavorable from the point of view of the flavor of a merchandise when it is used as a bottle or the like for packaging a food.

The polyethylene naphthalenedicarboxylate is preferably produced through a solid-phase polymerization, and the acetaldehyde content of such a polymer is preferably 8 ppm or less.

The amount of diethylene glycol component contained as a polymer constituent in the polyethylene naphthalenedicarboxylate is preferably 0.4–3.0% by weight. When it is less than 0.4% by weight, the melt viscosity increases, the plasticizing effect becomes smaller, and the share heat generation, etc., occurs on the molding of the polymer. This unfavorably causes the deterioration of the polymer. The exceeding of 3.0% by weight is not preferred since the strength of a molded product obtained from the polymer is decreased, and a problem of thickness deviation or the like occurs on extrusion molding or blow molding.

The intrinsic viscosity of the polyethylene naphthalenedicarboxylate is preferably 0.4 to 0.8. When the intrinsic viscosity is less than 0.4, the strength of a molded product prepared from the polymer is low, and the thickness deviation or the like occurs during the polymer is molded into a bottle by blow drawing; it is difficult to lead such a polymer into a bottle having a good appearance. When the intrinsic viscosity exceeds 0.8, the melt viscosity during molding is high, the molding becomes difficult, and the deterioration of the polymer is caused by shearing heat disadvantageously. Further, when the intrinsic viscosity exceeds 0.8, the elevation of the molding temperature decreases the melt viscosity and improves the moldability; however, unfavorably, the coloring of the polymer becomes extremely large, and the thermal deterioration of the polymer becomes sever.

The polyethylene naphthalenedicarboxylate can be a polyethylene naphthalenedicarboxylate produced by an ester exchange reaction.

The polyethylene naphthalenedicarboxylate can be a polyethylene naphthalenedicarboxylate produced by a direct esterification reaction.

When a polyethylene naphthalenedicarboxylate is produced by an ester exchange reaction, an ester exchange reaction catalyst and a polycondensation catalyst are used. As the ester exchange reaction catalyst, a compound which is known as an ester exchange reaction catalyst for a polyethylene terephthalate can be used. Examples of the usable ester exchange reaction catalyst include metal compounds such as a calcium compound, a zinc compound, a manganese compound, a magnesium compound, a titanium compound, a sodium compound, a potassium compound, a cerium compound, a lithium compound and the like. A manganese compound is especially preferred.

The amount of the ester exchange reaction catalyst added is preferably 10 to 50 mmol % based on the total dicarboxylic acid components. Here, a cobalt compound used as a color-controlling agent is not counted as the ester exchange reaction catalyst. When the amount of the catalyst added is less than 10 mmol %, the reactivity of the ester exchange reaction is low, and a large amount of unreacted terminal methyl groups will exist in a produced polymer or oligomer, and the methyl groups interfere a polycondensation reaction and unfavorably lower the speed of solid-phase polymerization when the polymer is subjected to solid-phase polymerization. When the amount of the catalyst added exceeds 50 mmol %, the hue is poor and the thermal stability is decreased in the produced polymer disadvantageously.

As the polycondensation catalyst, an antimony compound is used. Examples of the antimony compound include antimony oxides, antimony acetate and antimony glycolate. Especially, antimony trioxide is preferred.

The amount of an antimony compound added as the polycondensation catalyst is preferably 5 to 40 mmol % in terms of antimony trioxide based on the total of the dicarboxylic acid components used for producing polyethylene naphthalenedicarboxylate. The polyethylene naphthalenedicarboxylate resin composition therefore contains preferably 5 to 40 mmol % of an antimony compound in terms of antimony trioxide based on the total of the dicarboxylic acid components constituting the polyethylene naphthalenedicarboxylate. When the amount of the antimony compound added is less than 5 mmol %, the polymerization reactivity is unfavorably low, the polycondensation reaction needs a longer time, the production of byproducts increases and the hue becomes poor. Further, such an amount lowers production efficiency and is not economically preferred. When the amount exceeds 40 mmol %, the antimony compound causes blackening and color deterioration of the polymer, and the quality of the polymer is lowered; further, the decomposition reaction is accelerated, and the amount of byproducts are unfavorably increased.

When the polyethylene naphthalenedicarboxylate is produced by a direct esterification process, an antimony compound is used as a polycondensation catalyst.

Examples of the antimony compound include antimony oxides, antimony acetate and antimony glycolate. Especially, antimony trioxide is preferred.

The amount of antimony compound added as a polycondensation catalyst is preferably 5 to 40 mmol % in terms of antimony trioxide based on the total of the dicarboxylic acid components used for producing polyethylene naphthalenedicarboxylate. The polyethylene naphthalene-dicarboxylate resin composition therefore contains preferably 5 to 40 mmol % of an antimony compound in terms of antimony trioxide based on the total of the dicarboxylic acid components constituting the polyethylene naphthalenedicarboxylate. When the amount is less than 5 mmol %, the polymerization activity is low, the polycondensation reaction needs a longer time, the production of byproducts increases, and the hue unfavorably becomes poor. Further, such an amount lowers production efficiency and is not economically preferred. When the amount of the catalyst added exceeds 40 mmol %, the antimony compound causes blackening and color deterioration of the polymer, and the quality of the polymer is lowered; further, the decomposition reaction is accelerated, and the amount of byproducts are unfavorably increased.

<<Phosphorous Compound>>

The phosphorous compound of the present invention is expressed by the following formula 1, and its acid dissociation constant pKa is not less than 1.0.

Formula 1:

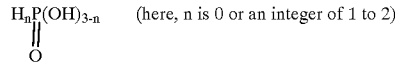
$H_nP(OH)_{3-n}$ (here, n is 0 or an integer of 1 to 2)
$\parallel$
O

The use of a phosphorous compound satisfying the above conditions can impart an excellent hue to the polymer produced and at the same time can suppress the deposition of particles attributable to the catalyst.

Examples of a phosphorous compound satisfying the above conditions include orthophosphoric acid, phosphorous acid and hypophosphorous acid. Especially, orthophosphoric acid and phosphorous acid, whose reductive powers are not strong, are preferred.

When the polyethylene naphthalenedicarboxylate is produced by an ester exchange reaction, the amount of the above phosphorous compound added to the reaction system is preferably 0.7 to 2.0 times by mol based on the amount of an ester exchange reaction catalyst.

Further, when the polyethylene naphthalenedicarboxylate is produced by a direct esterification process, the amount of the above phosphorous compound added to the reaction system is preferably 5 to 100 mmol % based on the total of the dicarboxylic acid components used for producing the polyethylene naphthalenedicarboxylate.

The polyethylene naphthalenedicarboxylate resin composition therefore contains the above phosphorous compound preferably in an amount of 0.7 to 2.0 times by mol based on the amount of the ester exchange reaction catalyst when the polyethylene naphthalenedicarboxylate is produced by an ester exchange reaction process. Here, in the calculation of the ratio of the phosphorous compound to the ester exchange reaction catalyst in the ester exchange process, the cobalt compound used as a color-controlling agent is counted as the ester exchange reaction catalyst.

When the content of the above phosphorous compound is less than 0.7 time by mol, the ester exchange reaction catalyst is not sufficiently deactivated, the thermal stability of the polymer is unfavorably low, and the hue is poor. When the content of the above phosphorous compound exceeds 2.0 times by mol, the thermal stability of the polymer is unfavorably low and the hue is poor.

When the polyethylene naphthalenedicarboxylate is produced by a direct esterification process, the polyethylene naphthalenedicarboxylate rein composition contains the above phosphorous compound preferably in an amount of 5 to 100 mmol % based on the total of the dicarboxylic acid component used for the production of the polyethylene naphthalenedicarboxylate.

When the content of the above phosphorous compound is less than 0.5 mmol % or more than 100 mmol %, the hue and the thermal stability of the polymer become unfavorably poor.

<<Cobalt Compound>>

A cobalt compound is used as a color-controlling agent. The polyethylene naphthalenedicarboxylate resin composition of the present invention therefore contains a cobalt compound.

Examples of the cobalt compound include the acetate, carbonate, oxides and chloride. Especially, the acetate is preferred. The content of a cobalt compound is preferably 3 to 35 mmol %, further preferably 5–20 mmol %, based on the total of the acid components. The content of less than 3 mmol % is not preferred since it gives only little improving effect on hue and does not sufficiently suppress the yellowing of the polymer, although it is good in the transparency of the polymer. The content of larger than 35 mmol % can suppress the yellowing of the polymer, but it is not preferred from the point of view of hue since it causes the graying of the hue of the polymer.

A cobalt compound as the color-controlling agent is used at a molar ratio to an antimony compound used as the polycondensation catalyst preferably of 0.1 to 1.0 in terms of a molar ratio of cobalt element to antimony element (Co element/Sb element). When the molar ratio (Co element/Sb element) is less than 0.1, the polymer unfavorably becomes yellowish. When the molar ratio (Co element/Sb element) is larger than 1.0, the polymer unfavorably becomes grayish although the yellowish color of the polymer is suppressed.

<<Deposited Particles and Foreign Matters>>

The polyethylene naphthalenedicarboxylate resin composition of the present invention can have the following characteristics as preferable properties.

The number of deposited particles present in a polyethylene naphthalenedicarboxylate resin composition of the present invention, attributable to the catalyst and having particle diameters of larger than 5 μm is preferably not more than 10 per 1 g of the polyethylene naphthalenedicarboxylate resin composition. When the number of the deposited particles exceeds 10, the transparency of the polymer is lost disadvantageously.

The number of foreign matters present in a polyethylene naphthalenedicarboxylate resin composition of the present invention and having particle diameters of larger than 2 μm is preferably not more than 1000 per 1 g of the polyethylene naphthalenedicarboxylate resin composition. When the number of the foreign matters exceeds 1000, the transparency of the polymer is unfavorably lost because the foreign matters work as nucleating agents to accelerate the crystallization of the polymer.

The polyethylene naphthalenedicarboxylate resin composition of the present invention needs preferably no more than 100 sec for filtering the solution prepared by dissolving 1 g of the resin composition in 20 ml of a mixed solvent of hexafluoroisopropanol/chloroform of 1/1 by suctioning through a 1 μm-membrane filter with a suctioning area of 2.0 $cm^2$ at 20 mmHg. It is not preferred that the time needed for the filtration is more than 100 sec since the quantities of the deposited particles attributable to the catalyst and the extraneous foreign matters are large in such a case, and the transparency of the obtaining polymer is poor.

<<Additives>>

The polyethylene naphthalenedicarboxylate resin composition of the present invention optionally contains various kinds of additives such as an antioxidant, an ultraviolet absorbent, an antistatic agent and the like.

<<Solid-Phase Polymerization>>

The polyethylene naphthalenedicarboxylate of the present invention is preferably produced through the processes including a solid-phase polymerization, and the intrinsic viscosity of the prepolymer which is to be subjected to the solid-phase polymerization is preferably 0.3–0.55. When the intrinsic viscosity of the prepolymer is less than 0.3, the increasing increment of the intrinsic viscosity by solid-phase polymerization becomes large, and consequently the temperature of the solid-phase polymerization is needed to elevate, and the hue of the polymer becomes poor unfavorably. Further, such an intrinsic viscosity is not preferred because the degree of crystallization in the polymer is increased, a long melting time is needed during molding and a problem of unmelted matters in molding occurs disadvantageously. Furthermore, it is not preferable from the standpoint of productivity. When the intrinsic viscosity of the prepolymer exceeds 0.55, the load to the solid-phase polymerization is little, but the reaction time is shortened, and the reaction temperature is low. Thereby, the amounts of dispersions of byproducts such as acetaldehyde, oligomers, monomers and the like which have been generated during the melt polymerization are little, and byproducts such as aldehyde and the like remain in the obtained polymer in large amounts unfavorably.

<<Bottle>>

The polyethylene naphthalenedicarboxylate resin composition of the present invention is especially preferred for the use of bottles. The formation of a bottle by using a polyethylene naphthalenedicarboxylate resin composition of the present invention enables the production of a bottle whose barrel has a haze of 2% or less. This haze is the value that is determined at a thickness of 300 μm. The case where the haze is large, exceeding 2%, is often attributable to the cloudiness caused by the deposited particles of the catalyst and the crystallization of the polymer, and the appearance of such a bottle is unfavorably poor as a commercial product. The thickness of the bottle differs depending on the volume and application, but usually it is 200 to 500 μm. The haze of the barrel of such a bottle is preferably 2% or less.

Bottles can be produced according to a conventional method.

EXAMPLES

The present invention will be explained further in detail hereafter with examples.

The characteristic properties are evaluated according to the following evaluation methods.

(1) Intrinsic viscosity (dl/g)

This is calculated from the viscosity of a solution measured at 35° C. using a mixed solvent of phenol/tetrachloroethane (component weight ratio: 6/4).

(2) The Number of Deposited Particles.

A polyethylene naphthalenedicarboxylate polymer in an amount of 1 g in terms of the resin composition is dissolved in 20 ml of a mixed solvent of hexafluoroisopropanol/chloroform (component weight ratio: 1/1), and the obtained solution is filtered through a 1 μm membrane filter. The number of deposited particles remained on the filter attributable to the catalyst is evaluated by observing it with a scanning electron microscope.

(3) The Number of Foreign Matters

A polyethylene naphthalenedicarboxylate polymer in an amount of 2 g in terms of the resin composition is dissolved in 60 ml of triethylene glycol, and the prepared solution is evaluated by using a coulter counter made by COULTER.

(4) The Content of Carboxyl Terminal Groups

A polyethylene naphthalenedicarboxylate polymer is crushed with a crusher into powder of 35 to 42 mesh in size, and the powder in an amount of 40 mg in terms of the resin composition is dissolved in 10 ml of benzyl alcohol. The content of carboxyl terminal groups is calculated from the value obtained by titration using sodium hydroxide in the presence of a phenol red indicator.

(5) The Content of Acetaldehyde

A polyethylene naphthalenedicarboxylate polymer (this may be called a polyethylene naphthalenedicarboxylate resin composition) is pulverized by freezing and crushing, and the content of acetaldehyde of the prepared sample is determined by HS-GC of Hitachi Ltd.

(6) Haze

A polyethylene naphthalenedicarboxylate polymer (this may be called a polyethylene naphthalenedicarboxylate resin composition) is dried at 160° C. for 5 hr and molded using a 100 DM injection molding machine of Meiki Seisakusho Co., Ltd. at a molding temperature of 305° C. to obtain 55 g of a preform. The preform is subjected to blow drawing to obtain a bottle of 1.5 ml in an inner volume having a barrel thickness of 300 μm. A barrel portion of the bottle is cut out and measured for its haze by a haze meter of Nippon Denshoku Kogyo K.K.

(7) Filtration Time

A polyethylene naphthalenedicarboxylate polymer (this may be called a polyethylene naphthalenedicarboxylate resin composition) in an amount of 1 g is dissolved in 20 ml of a mixed solvent of hexafluoroisopropanol/chloroform (component weight ratio: 1/1), and the obtained solution is filtered through a 1 μm membrane filter with a suctioning area of 2.0 $cm^2$ at 20 mmHg by suctioning using an aspirator. The time needed for filtering the above solution is determined.

Example 1

100 Parts by weight of dimethyl 2,6-naphthalenedicarboxylate and 51 parts by weight of ethylene glycol were subjected to an ester exchange reaction in accordance with a commonly used method by using 0.010 part by weight (10 mmol % based on the total dicarboxylic acid components) of cobalt acetate tetrahydrate and 0.030 part by weight (30 mmol % based on the total dicarboxylic acid components) of manganese acetate tetrahydrate. Before the termination of the ester exchange reaction, 0.020 part by weight (50 mmol % based on the total dicarboxylic acid components) of orthophosphoric acid was added.

Subsequently, the product was subjected to a polycondensation reaction in accordance with a commonly used method in the presence of 0.012 part by weight (10 mmol % based on the total dicarboxylic acid components) of antimony trioxide as a polycondensation catalyst to obtain a polyethylene naphthalenedicarboxylate prepolymer having an intrinsic viscosity of 0.48. This prepolymer was further polymerized in a solid state at 230° C. for 15 hr in accordance with a commonly used method to obtain a polyethylene naphthalenedicarboxylate polymer having an intrinsic viscosity of 0.65.

Further, this polyethylene naphthalenedicarboxylate polymer contains an antimony compound, a cobalt compound, a phosphorous compound and the like, and thereby the polymer may be called a polyethylene naphthalenedicarboxylate resin composition. Characteristic properties of this polyethylene naphthalenedicarboxylate resin composition are shown in Table 1.

Comparative Example 1

Processes were carried out as in Example 1 except that trimethyl phosphate in an amount of 0.029 part by weight (50 mmol % based on the total dicarboxylic acid components) was used in stead of orthophosphoric acid to obtain a polyethylene naphthalenedicarboxylate prepolymer having an intrinsic viscosity of 0.49. This prepolymer was further polymerized in a solid state in a same method as in Example 1 at 220° C. for 18 hr to obtain a polyethylene naphthalenedicarboxylate having an intrinsic viscosity of 0.64.

Further, this polyethylene naphthalenedicarboxylate polymer contains an antimony compound, a cobalt compound, a phosphorous compound and the like, and thereby the polymer may be called a polyethylene naphthalenedicarboxylate resin composition. Characteristic properties of this polyethylene naphthalenedicarboxylate resin composition are shown in Table 1.

Examples 2 and 3, and Comparative Examples 2 and 3

Using catalyst compositions and phosphorous compounds shown in Table 1, polyethylene naphthalenedicarboxylate prepolymers were obtained by polymerizing in the same process as in Example 1. These prepolymers were further polymerized in a solid state in a same method as in Example 1 at 230° C. for 15 hr (Example 2 and Comparative Example 2) or at 220° C. for 18 hr (Example 3 and Comparative Example 3).

Further, these polyethylene naphthalenedicarboxylate polymers contain each an antimony compound, a cobalt compound, a phosphorous compound and the like, and thereby the polymers may be called polyethylene naphthalenedicarboxylate resin compositions. Characteristic properties of these polyethylene naphthalenedicarboxylate resin compositions are shown in Table 1.

Example 4

100 Parts by weight of 2,6-naphthalenedicarboxylic acid and 46 parts by weight of ethylene glycol were subjected to an esterification reaction in accordance with a commonly used method. Subsequently, 0.004 part by weight (10 mmol % based on the total dicarboxylic acid components) of orthophosphoric acid, 0.005 part by weight (5 mmol % based on the total dicarboxylic acid components) of cobalt acetate tetrahydrate and 0.012 part by weight (10 mmol % based on the total dicarboxylic acid components) of antimony trioxide were added to the reaction mixture, and they were subjected to a polycondensation reaction in accordance with a commonly used method to obtain a polyethylene naphthalenedicarboxylate prepolymer. This prepolymer was polymerized in a solid state in accordance with a commonly used method at 220° C. for 18 hr to obtain a polyethylene naphthalenedicarboxylate polymer having an intrinsic viscosity of 0.65.

Further, this polyethylene naphthalenedicarboxylate polymer contains an antimony compound, a cobalt compound, a phosphorous compound and the like, and thereby the polymer may be called a polyethylene naphthalenedicarboxylate resin composition. Characteristic properties of this polyethylene naphthalenedicarboxylate resin composition are shown in Table 1.

TABLE 1

| | Catalyst Composition (mmol%) | | | Phosphorous Compound (mmol%) | | | Polyethylene naphthalenedicarboxylate Prepolymer | | | | | Polyethylene naphthalenedicarboxylate Polymer After Solid-State Polymerization | | | |
|---|---|---|---|---|---|---|---|---|---|---|---|---|---|---|---|
| | Co | Mn | Sb | A | B | C | Intrinsic Viscosity | DEG (wt %) | Number of Deposited Particles >5 μm | Number of Foreign Matters >2 μm | Filtration Time (sec) | Intrinsic Viscosity | Content of COOH Terminal Group (eq/T) | AA (ppm) | Bottle Haze (%) |
| Example 1 | 10 | 30 | 10 | 50 | | | 0.49 | 1.35 | 0 | 760 | 77 | 0.65 | 14 | 2 | 0.9 |
| Example 2 | 10 | 30 | 10 | | 50 | | 0.49 | 1.81 | 2 | 850 | 65 | 0.64 | 16 | 2 | 1.1 |
| Example 3 | 25 | 40 | 30 | 70 | | | 0.51 | 1.45 | 5 | 910 | 97 | 0.65 | 13 | 4 | 1.4 |
| Example 4 | 5 | — | 10 | 20 | | | 0.48 | 1.51 | 1 | 640 | 81 | 0.65 | 15 | 1 | 1.0 |
| Comparative Example 1 | 10 | 30 | 27 | | | 40 | 0.49 | 1.76 | 16 | 2120 | 1500 | 0.66 | 13 | 2 | 2.9 |

TABLE 1-continued

| | Catalyst Composition (mmol%) | | | Phosphorous Compound (mmol%) | | | Polyethylene naphthalenedicarboxylate Prepolymer | | | | | Polyethylene naphthalenedicarboxylate Polymer After Solid-State Polymerization | | | |
|---|---|---|---|---|---|---|---|---|---|---|---|---|---|---|---|
| | | | | | | | Intrinsic Viscosity | DEG (wt %) | Number of Deposited Particles >5 μm | Number of Foreign Matters >2 μm | Filtration Time (sec) | Intrinsic Viscosity | Content of COOH Terminal Group (eq/T) | AA (ppm) | Bottle Haze (%) |
| | Co | Mn | Sb | A | B | C | | | | | | | | | |
| Comparative Example 2 | 10 | 30 | 10 | | | 50 | 0.49 | 1.66 | 12 | 1300 | 1080 | 0.65 | 16 | 2 | 2.1 |
| Comparative Example 3 | 30 | 30 | 30 | | | 70 | 0.49 | 1.44 | 25 | 2480 | 2400 | 0.65 | 12 | 2 | 3.2 |

In TABLE 1, the followings are defined:
>5 μm:exceeding 5 μm
>2 μm:exceeding 2 μm
AA:acetaldehyde
DEG:diethylene glycol
Phosphorous compounds are defined as follows:
A:orthophosphoric acid
B:phosphorous acid
C:trimethyl phosphate
Further, the amount of Sb is expressed in terms of antimony trioxide.

As it is clear from the above examples, the present invention enables the wide range of reductions of the number of deposited particles attributable to catalysts and that of foreign matters, and the wide range of improvement of the transparency of a bottle.

EFFECT OF THE INVENTION

The present invention can provide a polyethylene naphthalenedicarboxylate resin composition that is produced by using an antimony compound as a polycondensation catalyst, and a polyethylene naphthalenedicarboxylate resin composition containing a cobalt compound as a color-controlling agent and having excellent transparency and hue.

The polyethylene naphthalenedicarboxylate resin composition of the present invention can produce a product having a high commercial value when used especially for a bottle or a sheet.

What is claimed is:
1. A polyethylene naphthalenedicarboxylate resin composition comprising a polyethylene naphthalenedicarboxylate, an antimony compound, a cobalt compound and a phosphorus compound, wherein:
   the phosphorus compound has an acid dissociation constant pKa of not less than 1.0 and the phosphorus compound is either phosphorous acid or a compound represented by the following Formula 1:

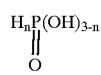

Formula 1 wherein n is 0, 1, or 2;
   the content of the antimony compound is from 5 to 40 mmol % in terms of antimony trioxide based on the total dicarboxylic acid components constituting the polyethylene naphthalenedicarboxylate;
   the content of the cobalt compound is from 3 to 35 mmol % based on the total dicarboxylic acid components constituting the polyethylene naphthalenedicarboxylate;
   the molar ratio of the contents of the antimony compound and the cobalt compound is in the range of cobalt element/antimony element=0.1 to 1.0; and
   the polyethylene naphthalenedicarboxylate is produced by either an ester exchange reaction or a direct esterification reaction; provided that when the polyethylene naphthalenedicarboxylate is produced by an ester exchange reaction, the content of the phosphorus compound is from 0.7 to 2.0 times by mol based on the content of the ester exchange reaction catalyst used for the production of the polyethylene naphthalene dicarboxylate,
   and when the polyethylene naphthalenedicarboxylate is produced by a direct esterification reaction, the content of the phosphorus compound is from 5 to 100 mmol % based on the total dicarboxylic acid components used for the production of the polyethylene naphthalenedicarboxylate.

2. A polyethylene naphthalenedicarboxylate resin composition comprising a polyethylene naphthalenedicarboxylate, an antimony compound, a cobalt compound and a phosphorus compound, wherein:
   the polyethylene naphthalenedicarboxylate simultaneously satisfies the following conditions (1) to (3): (1) the content of carboxyl terminal group is 32 eq/T ($10^6$ g) or less, (2) the content of acetaldehyde is 500 ppm or less, and (3) the content of diethylene glycol component is from 0.4 to 3.0% by weight;
   the phosphorus compound has an acid dissociation constant pKa of not less than 1.0 and the phosphorus compound is either phosphorous acid or a compound represented by the following Formula 1:

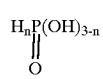

Formula 1 wherein n is 0, 1, or 2;

the content of the antimony compound is from 5 to 40 mmol % in terms of antimony trioxide based on the total dicarboxylic acid components constituting the polyethylene naphthalenedicarboxylate;

the content of the cobalt compound is from 3 to 35 mmol % based on the total dicarboxylic acid components constituting the polyethylene naphthalenedicarboxylate;

the molar ratio of the contents of the antimony compound and the cobalt compound is in the range of cobalt element/antimony element=0.1 to 1.0; and the polyethylene naphthalenedicarboxylate is produced by either an ester exchange reaction or a direct esterification reaction; provided that when the polyethylene naphthalenedicarboxylate is produced by an ester exchange reaction, the content of the phosphorus compound is from 0.7 to 2.0 times by mol based on the content of the ester exchange reaction catalyst used for the production of the polyethylene naphthalene dicarboxylate, and when the polyethylene naphthalenedicarboxylate is produced by a direct esterification reaction, the content of the phosphorus compound is from 5 to 100 mmol % based on the total dicarboxylic acid components used for the production of the polyethylene naphthalenedicarboxylate.

3. The polyethylene naphthalenedicarboxylate resin composition of claim 1, wherein the phosphorus compound is orthophosphoric acid and/or phosphorus acid.

4. The polyethylene naphthalenedicarboxylate resin composition of claim 1, wherein the number of deposited particles having particle diameters larger than 5 $\mu$m attributable to the catalyst is 10 or less per 1 g of the polyethylene naphthalenedicarboxylate resin composition.

5. The polyethylene naphthalenedicarboxylate resin composition of claim 1, wherein the number of foreign matters having particle diameters larger than 2 $\mu$m is 1000 or less per 1 g of the polyethylene naphthalenedicarboxylate resin composition.

6. The polyethylene naphthalenedicarboxylate resin composition of claim 1, wherein 1 g of the polyethylene naphthalenedicarboxylate resin composition is dissolved in 20 ml of a mixed solvent of hexafluoroisopropanol/chloroform and the resulting solution is filtered through a 1 $\mu$m membrane filter with a suctioning area of 2.0 cm$^2$ at 20 mmHg by suctioning using an aspirator, and the time needed for filtering is 100 sec or less, and further wherein the mixed solvent of hexafluoroisopropanol/chloroform has a component weight ratio of 1/1.

7. The polyethylene naphthalenedicarboxylate resin composition of claim 1, wherein the polyethylene naphthalenedicarboxylate has an intrinsic viscosity of 0.4 to 0.8.

8. The polyethylene naphthalenedicarboxylate resin composition of claim 1, wherein the process for producing the polyethylene naphthalenedicarboxylate further comprises a solid-phase polymerization process into which a prepolymer having an intrinsic viscosity of 0.3 to 0.55 is charged.

9. A bottle produced from the polyethylene naphthalenedicarboxylate resin composition of claim 1, wherein a barrel portion of the bottle has a haze of 2% or less.

10. A bottle produced from the polyethylene naphthalenedicarboxylate resin composition of claim 2, wherein a barrel portion of the bottle has a haze of 2% or less.

* * * * *